(12) United States Patent
Li et al.

(10) Patent No.: US 11,903,110 B2
(45) Date of Patent: Feb. 13, 2024

(54) VIRTUAL AND PARALLEL POWER EXTRACTION METHOD BY USING TIME DIVISION

(71) Applicant: Huizhou Haomeishi Intelligent Technology Co., Ltd., Huizhou (CN)

(72) Inventors: Hui Li, Shenzhen (CN); Long Zhao, Shenzhen (CN); Wenfan Li, Shenzhen (CN)

(73) Assignee: HUIZHOU HAOMEISHI INTELLIGENT TECHNOLOGY CO., LTD., Huizhou (CN)

( * ) Notice: Subject to any disclaimer, the term of this patent is extended or adjusted under 35 U.S.C. 154(b) by 174 days.

(21) Appl. No.: 17/695,841

(22) Filed: Mar. 16, 2022

(65) Prior Publication Data
US 2022/0210888 A1    Jun. 30, 2022

Related U.S. Application Data

(63) Continuation of application No. PCT/CN2020/115207, filed on Sep. 15, 2020.

(30) Foreign Application Priority Data

Sep. 20, 2019  (CN) .......................... 201910892378.X

(51) Int. Cl.
    *H03J 3/00*      (2006.01)
    *H05B 45/40*     (2020.01)
    (Continued)

(52) U.S. Cl.
    CPC ............... *H05B 45/40* (2020.01); *H02J 3/00* (2013.01); *H02M 5/02* (2013.01); *H05B 45/355* (2020.01);
    (Continued)

(58) Field of Classification Search
    CPC ...... H02J 1/10; H02J 1/102; H02J 3/00; H02J 3/12; H02J 3/14; H02M 5/02; H02M 5/04;
    (Continued)

(56) References Cited

U.S. PATENT DOCUMENTS

| | | | |
|---|---|---|---|
| 2012/0014153 A1* | 1/2012 | Christoph | ............... H02M 3/07 363/132 |
| 2014/0159691 A1 | 6/2014 | Miyamae | |

FOREIGN PATENT DOCUMENTS

| | | |
|---|---|---|
| CN | 104579290 A | 4/2015 |
| CN | 105376911 A | 3/2016 |

(Continued)

OTHER PUBLICATIONS

International Search Report for PCT/CN2020/115207.

*Primary Examiner* — Long Nguyen

(57) ABSTRACT

A virtual and parallel power extraction method by using time division, comprising an alternating current load (1), a load end time-division power extraction control device (2), a switch end time-division power extraction control device (3), and a switch end power supply load (4). The alternating current load (1) is connected in parallel with the load end time-division power extraction control device (2); the switch end time-division power extraction control device (3) is connected in parallel with the switch end power supply load (4); a combination body formed by connecting the alternating current load (1) with the load end time-division power extraction control device (2) in parallel and the combination body formed by connecting the switch end time-division power extraction control device (3) with the switch end power supply load (4) in parallel are together connected in series in an alternating current circuit. The present invention provides an efficient power extraction method between an electronic switch and a connected load on the premise of (Continued)

having no a neutral line, and particularly solves the problem that the electronic switch is falsely turned off or incompletely turned off for a low-power LED lamp.

6 Claims, 2 Drawing Sheets

(51) Int. Cl.
  *H05B 45/355* (2020.01)
  *H05B 45/3725* (2020.01)
  *H05B 45/59* (2022.01)
  *H02J 3/00* (2006.01)
  *H02M 5/02* (2006.01)
(52) U.S. Cl.
  CPC ......... *H05B 45/3725* (2020.01); *H05B 45/59* (2022.01)
(58) Field of Classification Search
  CPC .......... H02M 5/32; H02M 5/38; H05B 45/40; H05B 45/355; H05B 45/3725; H05B 45/59
  See application file for complete search history.

(56) References Cited

FOREIGN PATENT DOCUMENTS

| | | |
|---|---|---|
| CN | 105406851 A | 3/2016 |
| CN | 206805194 U | 12/2017 |
| CN | 108882476 A | 11/2018 |
| CN | 109287056 A | 1/2019 |
| CN | 110649601 A | 1/2020 |
| CN | 210444018 U | 5/2020 |

\* cited by examiner

VIRTUAL AND PARALLEL POWER EXTRACTION METHOD BY USING TIME DIVISION

BACKGROUND

1. Technical Field

The present disclosure generally relates to the field of intelligent switches, and especially relates to a virtual and parallel power extraction method by using time division.

2. Description of Related Art

At present, zero-line-free power extraction of an electronic switch is always difficult, most are adopted for leakage current power extraction schemes of series connection of the electronic switch and an alternating current load, the scheme only adopts a current limiting mode to enable the load to just not work when the lamp is actually turned off, and particularly for an LED lamp with a small power, a phenomenon that the LED lamp flickers periodically or can't be turned off during turning off the LED lamp is also called as 'a ghost fire'. However, power consumption of the electronic switch during a normal operation, especially during wireless communication, is relatively high, which is very obvious, and this also makes the electronic switch difficult to be popularized in a conventional consumer market.

SUMMARY

The technical problems to be solved: in view of the shortcomings of the related art, the present disclosure relates to a virtual and parallel power extraction method by using time division which can implement a virtual parallel connection power supply distribution mode by using a time division mode, so that supply power of an alternating current load and supply power of an electronic switch are not in the same time period, and use energy storage characteristics of the alternating current load and a power supply of the electronic switch, the load is not related to power consumption of an intelligent switch when the load is turned on and turned off, so that the problem can be thoroughly solved.

The technical solution adopted for solving technical problems of the present disclosure is: a virtual and parallel power extraction method by using time division includes an alternating current load, a load end time division power extraction control device, a switch end time division power extraction control device and a switch end power supply load; the alternating current load is connected in parallel with the load end time division power extraction control device, the switch end time division power extraction control device connected in parallel with the switch end power supply load, and a parallel combination of the alternating current load and the load end time division power extraction control device, and a parallel combination of the switch end time division power extraction control device and the switch end power supply load are connected in series within a loop of an alternating current circuit.

The load end time division power extraction control device is configured to provide power for the alternating current load or the switch end power supply load in a first time period, and provide power for the switch end power supply load or the alternating current load in a second time period through a time proportional relationship that is based on complementary division of an alternating current period and established together with the switch end time division power extraction control device, and the time proportional relationship repeated according to the alternating current period.

The load end time division power extraction control device includes a load end timing controller and a load end electronic switching element electrically connected with the load end timing controller, and the load end timing controller configured to regularly control the load end electronic switching element to be turned on and turned off in each alternating current period according to a complementary division time ratio that is established together with the switch end time division power extraction control device.

The switch end time division power extraction control device includes a switch end timing controller and a switch end electronic switching element electrically connected with the switch end timing controller, and the switch end timing controller configured to regularly control the switch end electronic switching element to be turned on and turned off in each alternating current period according to a complementary division time ratio that is established together with the load end time division power extraction control device.

Wherein each of the load end timing controller and the switch end timing controller is selected from one of a microprocessor, a timer circuit, a standard clock and an alternating current voltage sampling feedback.

Wherein each of the load end electronic switching element and the switch end electronic switching element is selected from one of a transistor, a thyristor, a field-effect transistor and a relay.

The present disclosure provides the advantages as below: the present disclosure provides a high-efficiency power extraction method between an electronic switch and a load that connects with the electronic switch on the premise of no zero line, in particular to solve a problem that the electronic switch is falsely or incompletely turned off aiming at an LED lamp with a low power.

Figure 1:
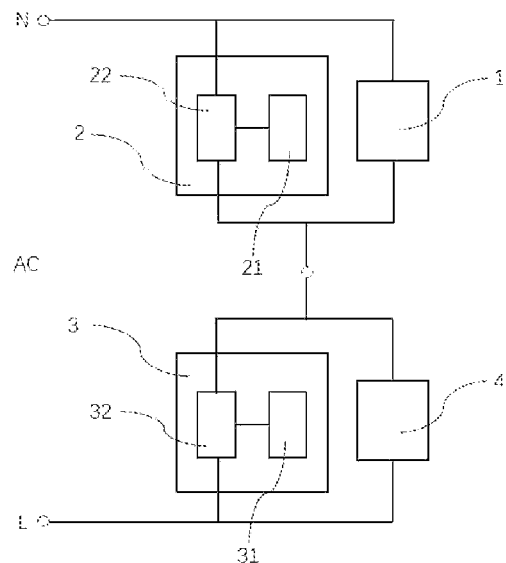
FIG. 1 is a block diagram of a system in accordance with the present disclosure.

The element labels according to the embodiment of the present disclosure shown as below:

alternating current load 1, load end time division power extraction control device 2, switch end time division power extraction control device 3, switch end power supply load 4, load end timing controller 21, load end electronic switching element 22, switch end timing controller 31, switch end electronic switching element 32, LED lamp load 5, load time division power extraction controller 6, switch time division power extraction controller 7, switch direct current power supply 8, 555 time-base timing control circuit 61, thyristor 62, CPU processor control circuit 71, field-effect transistor 72, first high time level 611, first time low level 711, first time power extraction 621, second time power extraction 721.

DETAILED DESCRIPTION

Unless otherwise defined, technical or scientific terms used herein shall have ordinary meanings as understood by one of ordinary skill in the art to which the present disclosure belongs. Terms "including", "includes", "comprises" or "comprising" and other similar words in the description and claims of the present disclosure mean that elements or items presented before the terms "including", "includes", "comprises" and "comprising" covers the element or item listed after the terms "including", "includes", "comprises" and "comprising" and their equivalents, and do not exclude other elements or items. The terms "connected" or "connection" and the like are not restricted to physical or mechanical connections, but can include electrical connections, whether direct or indirect.

Referring to FIG. 1, a virtual and parallel power extraction method by using time division includes an alternating current load 1, a load end time division power extraction control device 2, a switch end time division power extraction control device 3 and a switch end power supply load 4; the alternating current load 1 is connected in parallel with the load end time division power extraction control device 2, the switch end time division power extraction control device 3 connected in parallel with the switch end power supply load 4, and a parallel combination of the alternating current load 1 and the load end time division power extraction control device 2, and a parallel combination of the switch end time division power extraction control device 3 and the switch end power supply load 4 are connected in series within a loop of an alternating current circuit. The load end time division power extraction control device 2 is configured to provide power for the alternating current load 1 or the switch end power supply load 4 in a first time period, and provide power for the switch end power supply load 4 or the alternating current load 1 in a second time period through a time proportional relationship that is based on complementary division of an alternating current period, and established together with the switch end time division power extraction control device 3, and the time proportional relationship repeated according to the alternating current period.

The load end time division power extraction control device 2 includes a load end timing controller 21 and a load end electronic switching element 22 electrically connected with the load end timing controller 21, and the load end timing controller 21 configured to regularly control the load end electronic switching element 22 to be turned on and turned off in each alternating current period according to a complementary division time ratio that is established together with the switch end time division power extraction control device 3.

The switch end time division power extraction control device 3 includes a switch end timing controller 31 and a switch end electronic switching element 32 electrically connected with the switch end timing controller 31, and the switch end timing controller 31 configured to regularly control the switch end electronic switching element 32 to be turned on and turned off in each alternating current period according to a complementary division time ratio that is established together with the load end time division power extraction control device 2.

Figure 2:
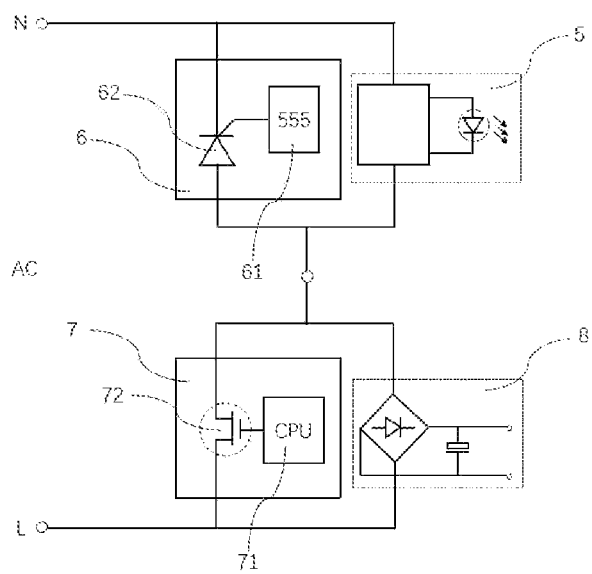
FIG. 2 is a schematic diagram of an application case of the present disclosure.
Figure 3:
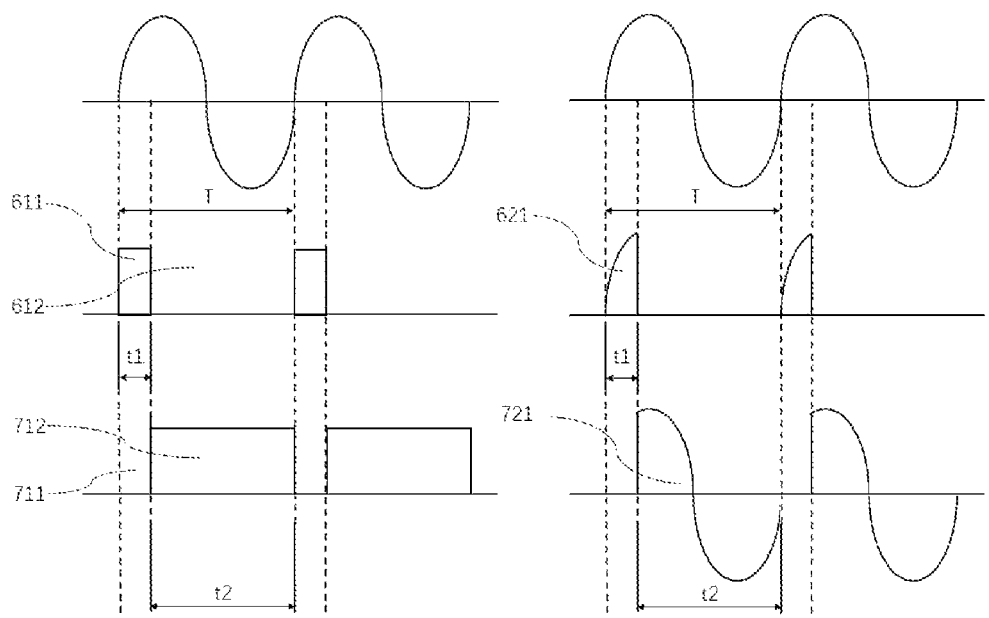
FIG. 3 is a schematic diagram of time division of the present disclosure.

Referring to FIG. 2 and FIG. 3, an application case of the present disclosure includes an LED load 5, a load time division power extraction controller 6, a switch time division power extraction controller 7 and a switch direct current power supply 8. The load time division power extraction controller 6 is connected in parallel with the LED load 5, and the switch time division power extraction controller 7 is connected in parallel with the switch direct current power supply 8; and a parallel combination of the LED load 5 and the load time division power extraction controller 6, and a parallel combination of the switch time division power extraction controller 7 and the switch direct current power supply 8 are connected in series within the loop of the alternating current circuit. The load time division power extraction controller 6 is configured to provide power for the switch direct current power supply 8 in a first time period t1, and provide power for the LED load 5 in a second time period t2, respectively through time proportional relationships t1 and t2, that are based on complementary division of an alternating current period T and established together with the switch time division power extraction controller 7, wherein T=t1+t2; and the time proportional relationship repeated according to the alternating current period.

The load time division power extraction controller 6 includes a 555 time-base timing control circuit 61 and a thyristor 62, the switch time division power extraction controller 7 includes a CPU processor control circuit 71 and a field-effect transistor 72. A duty cycle of the 555 time-base timing control circuit 61 is determined according to the complementary division time ratio T=t1+t2 that is established together with software data of the CPU processor control circuit 71.

At the time period of t1, the 555 time-base timing control circuit 61 outputs a first time high level 611 to control the thyristor 62 to be turned on, the CPU processor control circuit 71 outputs a first time low level 711 to control the field-effect transistor 72 to be turned off, and the alternating current is conducted from the switch direct current power supply 8 through the thyristor 62 to form a loop, at this time, the switch direct current power supply 8 obtains a first time power extraction 621.

At the time period of t2, the 555 time-base timing control circuit 61 outputs a second time low level 612 to control the thyristor 62 to be turned off, and the CPU processor control circuit 71 outputs a second time high level 712 to control the field-effect transistor 72 to be turned on, so that the alternating current is conducted from the LED lamp load 5 through the field-effect transistor to form a loop, and at this time, the LED lamp load 5 obtains a second time power extraction 721.

The above detailed description to the embodiment of the present disclosure is provided. Any variation or replacement made by one of ordinary skill in the related art without departing from the spirit of the present disclosure shall fall within the protection scope of the present disclosure.

What is claimed is:

1. A virtual and parallel power extraction method by using time division comprising an alternating current load (1), a load end time division power extraction control device (2), a switch end time division power extraction control device (3) and a switch end power supply load (4), and characterized in that: the alternating current load (1) is connected in parallel with the load end time division power extraction control device (2), the switch end time division power extraction control device (3) connected in parallel with the switch end power supply load (4), and a parallel combination of the alternating current load (1) and the load end time division power extraction control device (2), and a parallel combination of the switch end time division power extraction control device (3) and the switch end power supply load (4) are connected in series within a loop of an alternating current circuit;

the load end time division power extraction control device (2) configured to provide power for the alternating current load (1) or the switch end power supply load (4) in a first time period, and provide power for the switch end power supply load (4) or the alternating current load (1) in a second time period through a time proportional relationship that is based on complementary division of an alternating current period and established together with the switch end time division power extraction control device (3), and the time proportional relationship repeated according to the alternating current period;

the load end time division power extraction control device (2) comprising a load end timing controller (21) and a load end electronic switching element (22) electrically connected with the load end timing controller (21), and the load end timing controller (21) configured to regularly control the load end electronic switching element (22) to be turned on and turned off in each alternating current period according to a complementary division time ratio that is established together with the switch end time division power extraction control device (3); and the switch end time division power extraction control device (3) comprising a switch end timing controller (31) and a switch end electronic switching element (32) electrically connected with the switch end timing controller (31), and the switch end timing controller (31) configured to regularly control the switch end electronic switching element (32) to be turned on and turned off in each alternating current period according to a complementary division time ratio that is established together with the load end time division power extraction control device (2).

2. The virtual and parallel power extraction method as claimed in claim 1, wherein each of the load end timing controller (21) and the switch end timing controller (31) is selected from one of a microprocessor, a timer circuit, a standard clock and an alternating current voltage sampling feedback.

3. The virtual and parallel power extraction method as claimed in claim 2, wherein each of the load end electronic switching element (22) and the switch end electronic switching element (32) is a transistor.

4. The virtual and parallel power extraction method as claimed in claim 1, wherein each of the load end electronic switching element (22) and the switch end electronic switching element (32) is a thyristor.

5. The virtual and parallel power extraction method as claimed in claim 1, wherein each of the load end electronic switching element (22) and the switch end electronic switching element (32) is a field-effect transistor.

6. The virtual and parallel power extraction method as claimed in claim 1, wherein each of the load end electronic switching element (22) and the switch end electronic switching element (32) is a relay.

* * * * *